United States Patent [19]

Ejima

[11] Patent Number: 4,677,287
[45] Date of Patent: Jun. 30, 1987

[54] DOCUMENT READER WITH LIGHT SOURCE CONTROL

[75] Inventor: Yoshinori Ejima, Kawasaki, Japan

[73] Assignee: Canon Kabushiki Kaisha, Tokyo, Japan

[21] Appl. No.: 906,622

[22] Filed: Sep. 10, 1986

Related U.S. Application Data

[63] Continuation of Ser. No. 511,456, Jul. 7, 1983, abandoned.

[30] Foreign Application Priority Data

Jul. 14, 1982 [JP] Japan .................................. 57-121249
Oct. 9, 1982 [JP] Japan .................................. 57-176969

[51] Int. Cl.⁴ ........................... G01J 1/32; H04N 1/10
[52] U.S. Cl. ..................................... 250/205; 250/235; 358/293
[58] Field of Search ........................ 250/205, 234–236; 315/287, 307; 358/285, 293

[56] References Cited

U.S. PATENT DOCUMENTS

| | | | |
|---|---|---|---|
| 4,097,732 | 6/1978 | Krause et al. | 250/214 AG |
| 4,174,528 | 11/1979 | White | 358/293 |
| 4,250,488 | 2/1981 | Haupt | 250/205 |
| 4,250,526 | 2/1981 | Fuwa et al. | 358/285 |
| 4,270,131 | 5/1981 | Tompkins et al. | 358/285 |
| 4,352,553 | 10/1982 | Hirahara | 250/205 |

*Primary Examiner*—Edward P. Westin
*Attorney, Agent, or Firm*—Fitzpatrick, Cella, Harper & Scinto

[57] ABSTRACT

A document reader has a light source which is turned on upon energization, a read unit for reading an image of a document illuminated by the light source and a control circuit for controlling the energization of the light source. The read unit reads an intensity of a light reflected by a reference density pattern arranged externally of a document area prior to reading of the document and controls the energization of the light source in accordance with the detected light intensity.

26 Claims, 10 Drawing Figures

DOCUMENT READER WITH LIGHT SOURCE CONTROL

This application is a continuation of application Ser. No. 511,456 filed July 7, 1983, now abandoned.

BACKGROUND OF THE INVENTION

1. Field of the Invention

The present invention relates to a document reader for converting image information to an electric signal by scanning a document by an image pick-up device such as a charge storage type of photo-electric converter.

2. Description of the Prior Art

A prior art document reader of the type described above is shown in FIG. 1, in which numeral 1 denotes a fluorescent lamp drive circuit which is fed from an A.C. power supply, numeral 2 denotes a document illumination fluorescent lamp energized by the drive circuit 1, numeral 3 denotes a document illuminated by a light from the fluorescent lamp 2, numeral 4 denotes a lens system for focusing a reflected light including pixel information on the document 3 illuminated by the fluorescent lamp 2 onto a photosensing plane of an image pick-up device 5, numeral 6 denotes an image signal amplifier for amplifying an image signal produced by the photo-electric conversion by the image pick-up device 5, numeral 7 denotes an A/D converter for converting the image signal to a digital image signal, and numeral 8 denotes an automatic gain control circuit for compensating a variation of an output level of the digital image signal from the A/D converter 7. The level of the photo-electrically converted digital signal is kept constant by the automatic gain control circuit 8 and an image signal is sequentially taken out therefrom.

When the pixel information of the document 3 is photo-electrically converted, a signal output level changes depending on a luminance of the fluorescent lamp 2 and a background density of the document, and significantly varies depending on an amplification of the amplifier 6. The automatic gain control circuit 8 is used to compensate for the variation of the signal output level. For example, the background density of the document bearing the pixel information, that is, a white background area of the document is detected and the output signal level is kept constant based on the signal level of the white background area. An ordinary document includes the white area in each of scan lines and the signal level is maximum in the white area. Thus, the variation of the image signal output level is compensated by keeping the maximum value of the photo-electrically converted signal at a constant level.

However, when a document including a half-tone image in an entire area such as a photograph is to be read, a reference background area (white area) which an ordinary document includes is not present and a maximum level of the photo-electrically converted signal may change from scan to scan. Accordingly, if the level of the photo-electrically converted signal is controlled by the prior art method, the density of the reproduced image varies locally and an exact half-tone image is not reproduced. Accordingly, for the half-tone image such as the photograph, it is necessary to keep the amplification factor of the photo-electrically converted signal at a constant level during the reading of the document. If a surrounding temperature or a power supply voltage changes or the luminance of the fluorescent lamp changes by degradation during this period, the level of the photo-electrically converted signal varies and the image is not exactly reproduced.

Further, the reading operation of the image pick-up device is influenced by the light adjustment operation of the light source and a nonuniform image may be reproduced.

SUMMARY OF THE INVENTION

It is an object of the present invention to provide a document reader which can exactly read a document.

It is another object of the present invention to provide a document reader which can constantly set a luminance of a light source for reading a document at a constant level.

It is another object of the present invention to provide a document reader which can control a luminance with a simple circuit configuration without using a sensor for sensing the luminance of a document illumination light source.

It is a further object of the present invention to provide a document reader which reads a document when a read condition is met.

It is a still further object of the present invention to provide a document reader which eliminates a problem of image reading due to flickering of a light source.

The above and other objects and advantages of the present invention will be apparent from the following description of the invention.

DETAILED DESCRIPTION OF THE PREFERRED EMBODIMENTS

Figure 2:
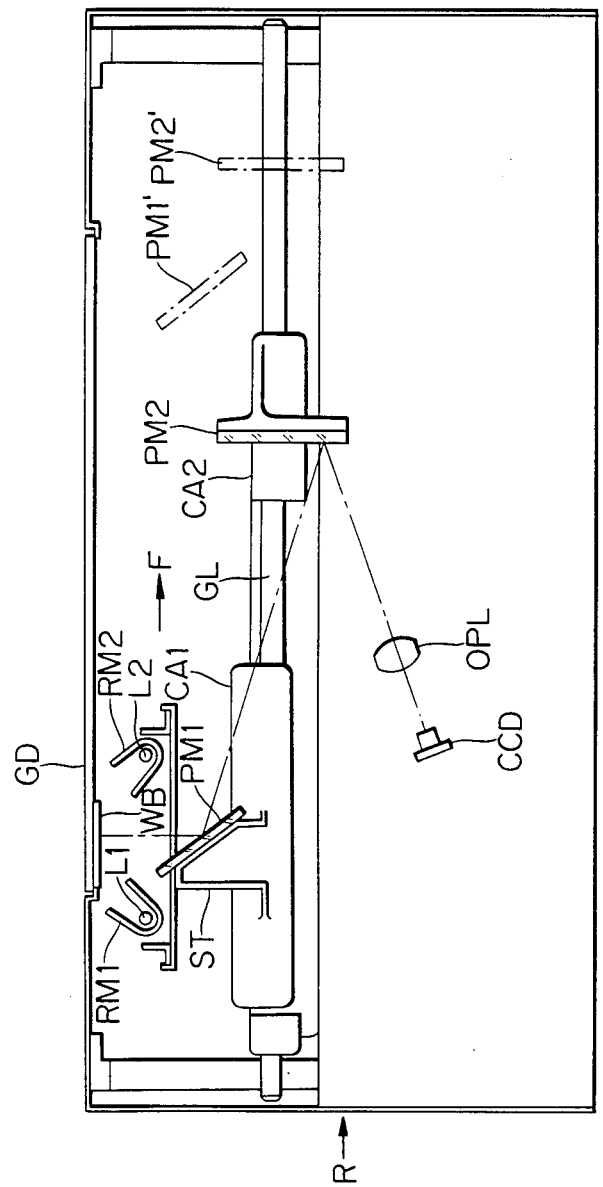
FIG. 2 is a schematic view of a document image reading unit.

FIG. 2 diagrammatically shows a schematic sectional view of a document image reading unit R in one embodiment of the present invention. A document mount GD made of glass is arranged at a top of the reading unit R and a user mounts a document to be reproduced on the document mount GD. Arranged under the document mount GD are fluorescent lamps L1 and L2 for illuminating the document, reflection mirrors RM1 and RM2 arranged such that the lights emitted from the fluorescent lamps L1 and L2 efficiently illuminate the document surface mounted on the document mount GD, first and second plane mirrors PM1 and PM2 for scanning (sub-scan) the document and a one-dimensional charge coupled device (CCD) for reading light transmitted through optical lens OPL which focuses the optical image of the document.

The light sources L1 and L2, the reflection mirrors RM1 and RM2 and the first plane mirror PM1 are supported in union by a support ST which is fixed to a carriage CA1. The carriage CA1 is reciprocated along a guide rail GL from left to right (forward direction) and from right to left by a known drive means. The second plane mirror PM2 is moved along the guide rail GL by a carriage CA2 in the same direction as the first plane mirror PM1 at one half speed of that of the first plane mirror PM1. At the end of the forward movement, the plane mirrors PM1 and PM2 have been moved to positions PM1' and PM2' shown by broken lines. An optical path length from the document mount GD to the image pick-up device CCD through the plane mirrors PM1 and PM2 and the lens OPL is always kept constant.

A main scan direction of the image pick-up device CCD is normal to the plane of the drawing. If the signals from the photo-sensing elements of the image pick-up device CCD are sequentially read out in a proper order during the forward movement of the plane mirrors PM1 and PM2, a sequential signal which raster-scan the document is produced.

A solid line position of the support ST indicates a home position at the start of document reading. When the support ST is at the home position ST, a white area WB arranged externally of a document mount area of the document mount GD is scanned in order to produce a reference read signal.

Figure 1:
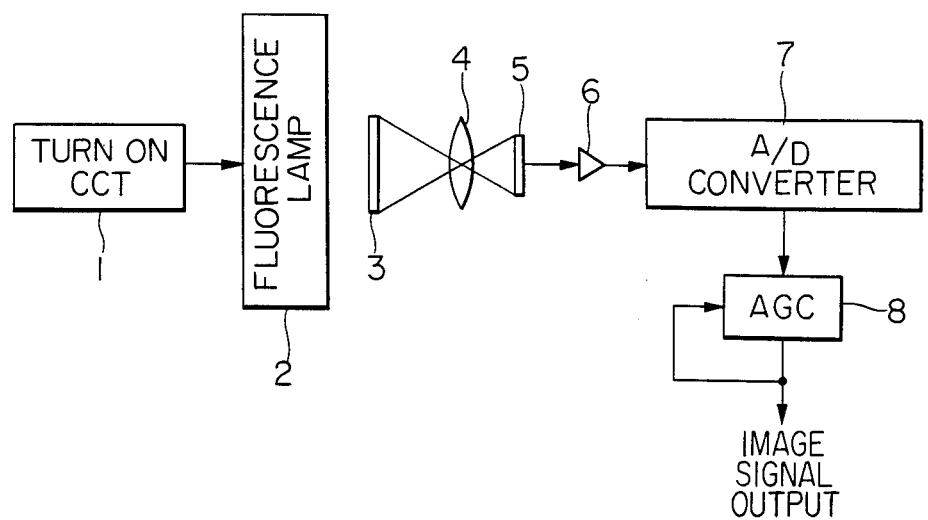
FIG. 1 is a block diagram of a prior art document reader.
Figure 3:
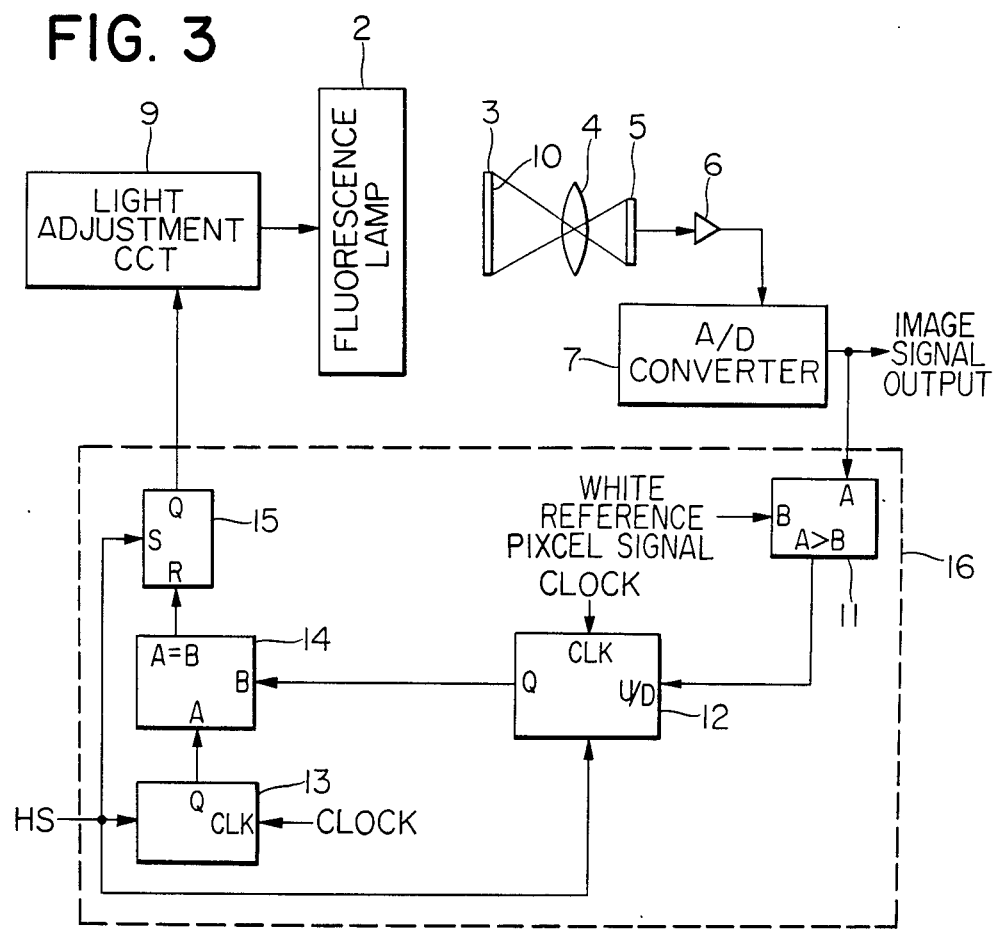
FIG. 3 shows an embodiment of a document reader in accordance with the present invention.

FIG. 3 shows one embodiment of a document reader of the present invention, in which the like elements to those of FIG. 1 are designated by the like numerals. Numeral 9 denotes a light adjustment circuit which controls a power supplied to the fluorescent lamp 2 by controlling a duty factor of a high frequency power supply, numeral 10 denotes a white area arranged externally of the document mount area of the document mount for the document 3 in order to produce a reference read signal, and numeral 11 denotes a comparator which compares a 6-bit image signal from the white area 10, which is supplied from an A/D converter 7 by a clock pulse $\phi$ with a preset 6-bit white reference pixel signal. It produces a compare output when the input reference pixel signal is larger than the white reference pixel signal. The compare output is supplied to an up-down control input terminal U/D of an up-down counter 12, which counts clock pulses applied to a terminal CLK in a direction determined by the input signal to the input terminal U/D in synchronism with a horizontal synchronizing signal HS applied at every beginning of one line of image reading, and produces a count output at an output terminal Q. Numeral 13 denotes a clock counter which counts the clock pulses applied to the terminal CLK in synchronism with the horizontal synchronizing signal HS which instructs the start of storage of the image pick-up device 5 for each line, and produces a count output at an output terminal Q. The count outputs from the counters 12 and 13 are supplied to a comparator 14 which produces a compare output when both count outputs are equal. The compare output is supplied to a reset input terminal R of a flip-flop 15 and the horizontal synchronizing signal HS is supplied to a set input terminal S of the flip-flop 15, which produces a control signal at an output terminal Q in synchronism with the horizontal synchronizing signal HS. The control signal is then supplied to the light adjustment circuit 9.

The circuits 11, 12, 13, 14 and 15 form an automatic gain control circuit 16 for the light adjustment circuit 9.

By the above circuits, a level change of the photo-electrically converted signal of the white area 10 due to a luminance change of the fluorescent lamp 2 is detected by the comparison with the white reference pixel signal of the pixel under consideration in one line by the comparator 11. In accordance with the compare output, the light adjustment circuit 9 changes the duty factor of the high frequency power supply to be applied to the fluorescent lamp 2 to control the luminance of the fluorescent lamp 2. This is more specifically described below.

When the flip-flop 15 is set by the horizontal synchronizing signal HS, the control signal output Q is kept at H level until the count outputs of the counters 12 and 13 coincide, that is, until the compare output signal from the comparator 14 assumes the H level, and the output Q is supplied to the light adjustment circuit 9. As a result, the fluorescent lamp 2 is turned on and the image reading by the image pick-up device 5 is started. The image signal stored in the image pick-up device 5 is read out by a scan clock not shown, supplied to the A/D converter 7 through the amplifier 6 and converted to the digital image signal.

Figure 4:
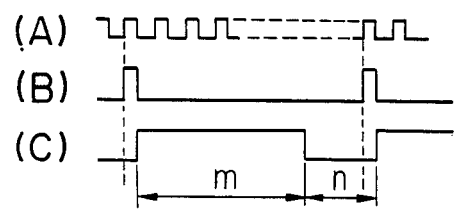
FIG. 4 illustrates light control in one scan.
Figure 5:
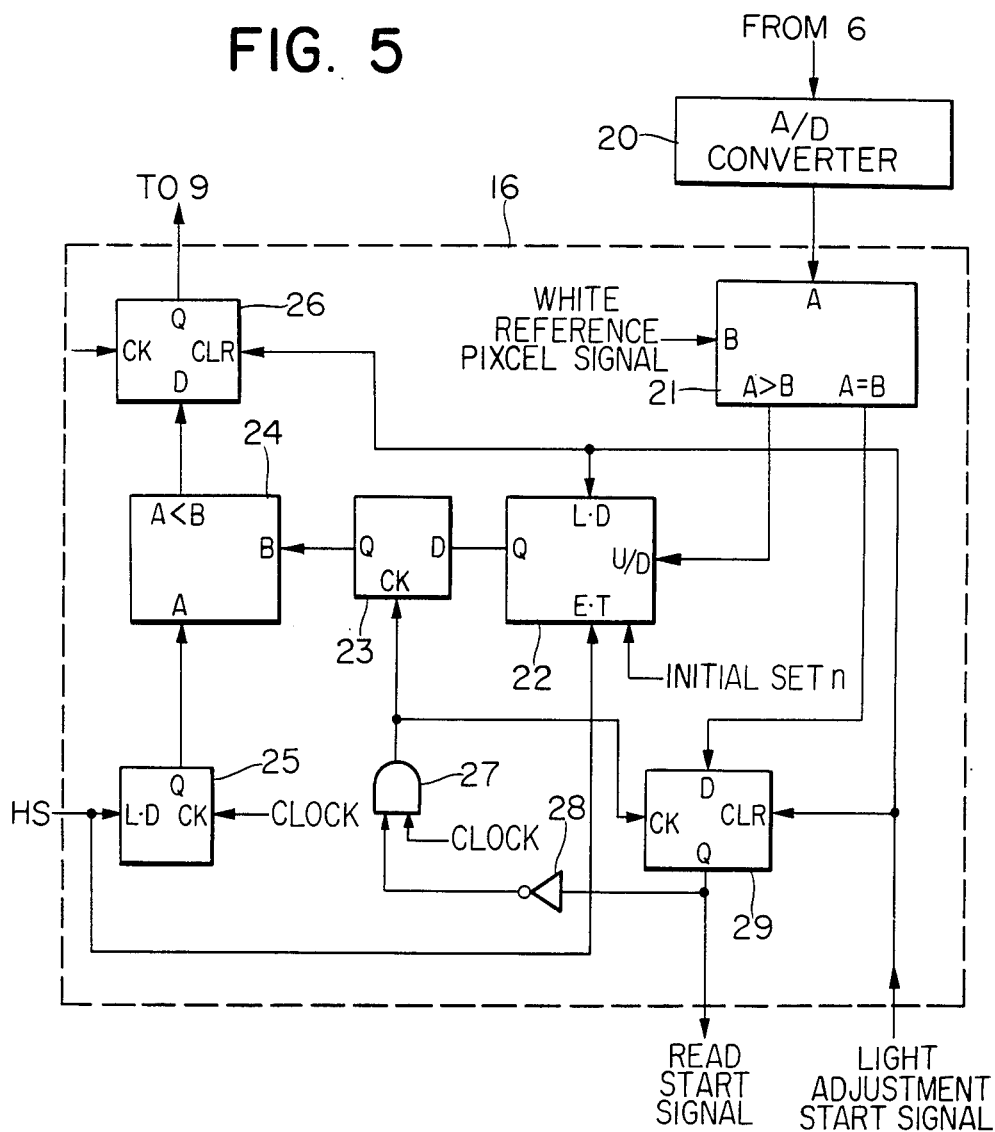
FIG. 5 shows an embodiment of an automatic gain control circuit.

A duty factor of the fluorescent lamp 2 in one scan period is illustrated in FIGS. 4(A)–(C). FIG. 4(A) shows the reference clock pulse train, FIG. 4(B) shows the horizontal synchronizing signal HS and FIG. 4(C) shows the output Q of the flip-flop 15. The fluorescent lamp 2 is turned on during a period of m clocks in one scan period starting from the fall of horizontal synchronizing signal HS and turned off during a period of n clocks. Accordingly, the duty factor of the fluorescent lamp 2 is given by $$\text{duty factor} = m/(m+n) \times 100 \, (\%)$$

Let us assume that the level of the white reference pixel signal applied to the terminal B of the comparator 11 is preset to (000001) and a pixel level read from the white area when the number of clocks is m, which is applied to the terminal A of the comparator 11, is (000010), that is, the luminance is under. Those levels are compared by the comparator 11. Since A>B, the comparator 11 produces the H-level output which is supplied to the up-down counter 12, which counts up the clock signal CLK so that the count reaches m+1. This count m+1 is set to the up-down counter 12 as the turn-on time of the fluorescent lamp in the next scan period. At the start of the next scan, the counter 13 starts to count the clock in synchronism with the horizontal synchronizing signal HS. The setting of the up-down counter 12 and the count (output Q) of the counter 13 are compared by the comparator 14. The output of the comparator 14 is at the H-level until the output Q of the counter 13 reaches m+1, and output Q of the flip-flop 15 is at the H-level from the fall of the horizontal synchronizing signal HS until the output of the comparator 14 assumes the L-level. The light adjustment circuit 9 turns on the fluorescent lamp 2 during the input of the H-level output Q.

When the output Q of the counter 13 reaches m+1, it coincides with the setting of the up-down counter 12 and the comparator 14 produces the L-level output and the flip-flop 15 produces the L-level output. As a result, the light adjustment circuit 9 turns off the fluorescent lamp 2. The charge stored in the image pick-up device 5 is again compared by the comparator 11, and if it is still smaller than the white reference signal, the up-down counter 12 is set to the count-up mode so that the count is incremented to m+2. As a result, the next illumination time is extended by one count period.

The above operation is repeated so that the turn-on time of the fluorescent lamp 2 in one scan period in incremented until the pixel level read from the white area 10 coincides with the white reference level, that is, until the comparator 11 produces the L-level output. In this manner, the duty factor of the fluorescent lamp 2 is controlled by utilizing the white area 10 so that the photo-electrically converted signal of a constant level is produced.

If the charge stored in the image pick-up device 5 is larger than the white reference signal, the up-down counter 12 is set to a count-down mode to decrement the count so that the turn-on time in the next scan is reduced.

After the luminance has been set to the desired level through a certain number of times of scan of the white area 10, the reading of the document is started.

While the white area is used to produce the reference pixel signal in the present embodiment, it is not limited to the white area but a half-tone area may be used to produce the reference pixel signal. By changing the preset level of the reference pixel signal of the comparator 11 depending on the density of the half-tone area, the same luminance control as that for the white area is attained. By providing the white and half-tone areas and selectively using them in accordance with a particular document, an image which is closer to the document pixel level can be reproduced. The document illumination light source is not limited to the fluorescent lamp but it may be another discharge tube such as a halogen lamp or any other light source.

The reference pixel signal may be an average of the pixel signals read in one scan period of the white area.

As described above, in the present embodiment, the preset reference density level and the pixel level read from the corresponding density area are compared and the duty factor of the turn-on signal supplied to the light adjustment circuit is controlled by the compare result to control the luminance of the illumination light source. Accordingly, the constant level of photo-electrically converted signal is always produced and an excellent quality of image is reproduced.

FIG. 13 shows another embodiment of the automatic gain control circuit 16 of FIG. 3. When a light adjustment start signal for the fluorescent lamp is applied in the read operation of the document, flip-flops 26 and 29 are cleared and an up-down counter 22 is set to a count mode to count the horizontal synchronizing signal HS. The light adjustment start signal also acts as a charge store start signal for the image pick-up device 5.

A count n corresponding to a normal turn-on time is preset to the up-down counter 22. A latch 23 supplies the count n preset in the up-down counter 23 to an input terminal B of a comparator 24 in synchronism with a clock from an AND gate 27 a count in a counter 25 which starts to count clocks in synchronism with horizontal synchronizing signal HS is applied to an input terminal A of the comparator 24, which compares the count A with the count from the latch 23 and supplies the H-level output to a flip-flop 26 when the count to the latch 23 is larger (A<B). The flip-flop 26 supplies the H-level signal (output Q) to the light adjusting circuit 9 in synchronism with the clock input when the H-level signal is applied thereto.

On the other hand, when the count of the counter 25 is equal to the count of latch 23, the comparator 4 produces the L-level output at a terminal A<B and the output Q of the flip-flop 26 synchronized with the clock assumes the L-level.

If the charge stored in the image pick-up device 5 does not reach the white reference signal level in the turn-on time, the signal at the output terminal A>B of the comparator 21 is at the H-level and the up-down counter 22 is set to the count-up mode so that it is incremented by one count (to count n+1) by the input of the horizontal synchronizing signal HS. The incremented count is supplied to the input terminal B of the comparator 24 through the latch 23 and it is compared with the count (output Q) of the counter 25 to control the turn-on time in one scan period.

The above operation is repeated until the signal read from the white area coincides with the white reference signal.

When the comparator 21 determines that the output of the A/D converter 20 and the white reference signal are equal, the comparator 21 produces the L-level output at the output terminal A>B and the H-level signal at the output terminal A=B. As a result, the flip-flop 29 produces the read start signal in synchronism with the clock from the AND gate 27 and deactivates the AND gate 27 through an inverter 28. Accordingly, the clock is not applied to the latch 23 and the present lach output is maintained. The count held in the latch 23 represents the number of clocks corresponding to an optimum turn-on time of the fluorescent lamp in one scan period. The read start signal from the flip-flop 29 is supplied to an exposure scan control unit such as a microcomputer not shown to start the exposure scan of the document. Accordingly, the document is exposed and scanned with the proper turn-on time.

When the input from the A/D converter 20 is larger than the white reference signal, the comparator 21 produces the L-level signal at the output terminal A>B so that the up-down counter 22 is set to the count-down mode to decrement the count in synchronism with the horizontal synchronizing signal HS. As a result, the count to the input terminal B of the comparator 24 is incremented and the turn-on time of the fluorescent lamp in one scan period is reduced.

When a new document is to be scanned, the light adjustment start signal is again applied and the flip-flops 26 and 29 are cleared and the up-down counter 22 starts new counting. After the determination of the optimum turn-on time by utilizing the white area, the document is exposed. Since the optimum amount of exposure is set for each document, the image can be read in high quality.

Figure 6:
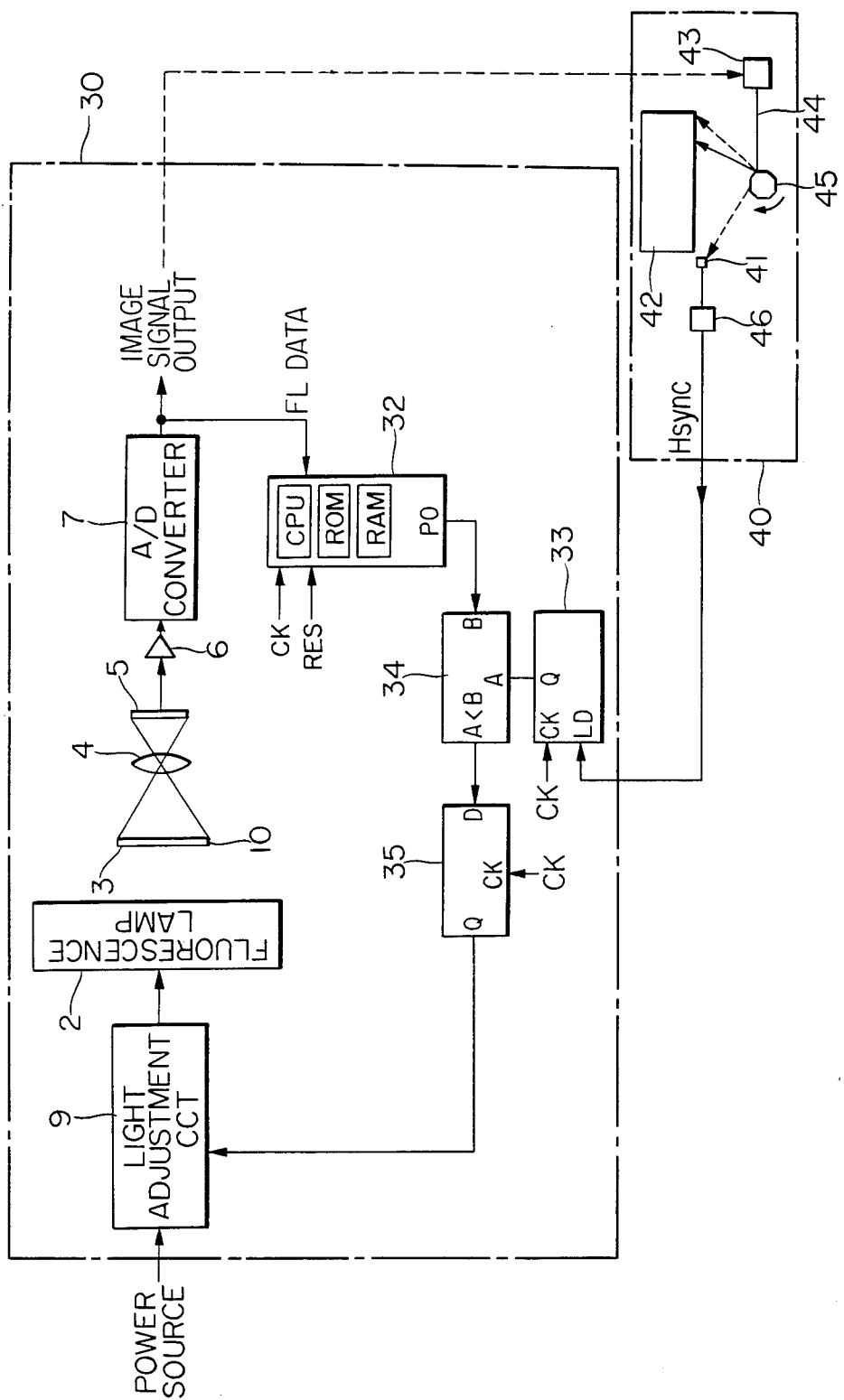
FIG. 6 shows another embodiment of the document reader in accordance with the present invention.

FIG. 6 shows another embodiment of the present invention. It shows a document read unit and a write unit in a laser beam printer. The like elements to those shown in FIG. 2 are designated by the like numerals. In the document read unit 30, numeral 10 denotes a white area arranged in an effective read area of the image pick-up device 5 such as on a document holder for producing a read signal, numeral 32 denotes a microcomputer which compares the read signal with a reference signal and carries out a predetermined arithmetic operatioh, numeral 33 denotes a counter for counting the clock bulse CK, numeral 34 denotes a comparator which receives the count from the counter 33 at an input terminal A and the operation result from the microcomputer 32 at an input terminal B and compares those inputs, and numeral 35 denotes a flip-flop which receives the compare output from the comparator 34 at an input terminal D and produces a control signal at an output terminal Q and supplies it to the light adjustment circuit 9. In the write unit 40, numeral 41 denotes a position detector for a laser beam, numeral 42 denotes a photosensitive material for forming an electrostatic latent image, numeral 43 denotes a laser oscillator, numeral 44 denotes a laser beam emitted from the laser oscillator 43, numeral 45 denotes a rotary polygon mirror for scanning the laser beam 44 onto the photosensitive material 42, and numeral 46 denotes a photoelectric converter which converts the light detection signal to an electrical signal and supplies it to the read unit 30.

With this arrangement, the level of the photo-electrically converted signal read from the white area illuminated by the fluorescent lamp 2 is compared with the reference signal and the turn-on time of the fluorescent lamp which illuminates the document is controlled and the turn-on cycle of the fluorescent lamp 2 is synchronized to the one line scan period of the write unit to control the amount of exposure to the document 3. This operation is described below in detail.

Figure 7:
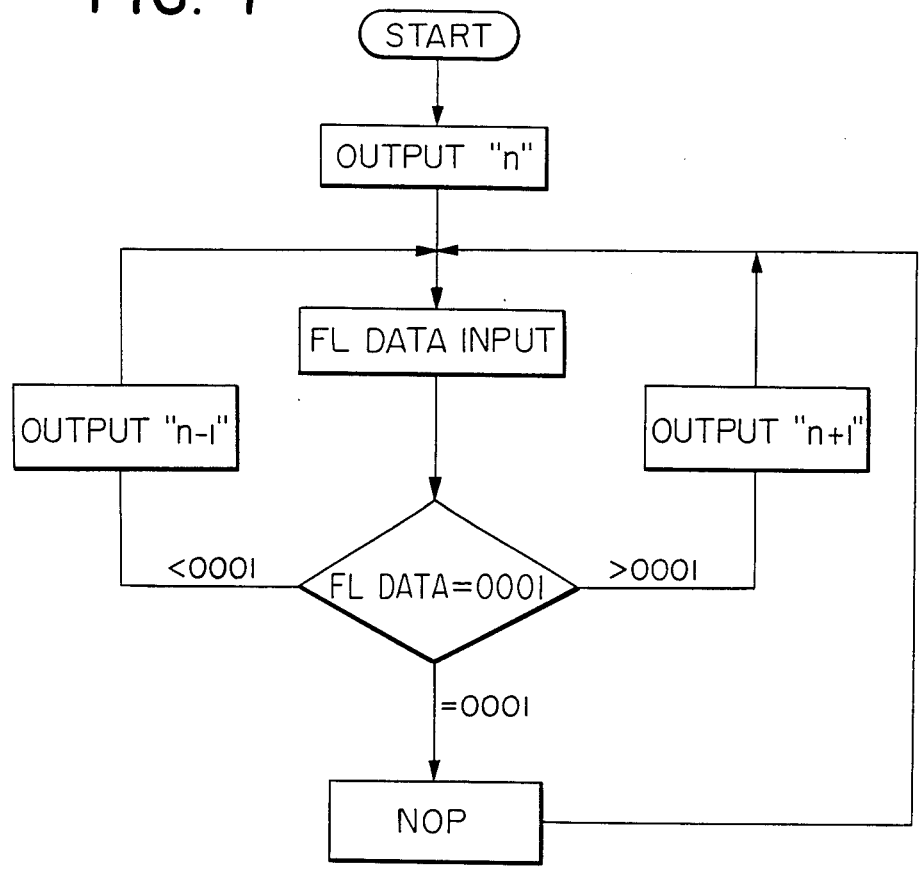
FIG. 7 is a flow chart of a control program for the circuit of FIG. 6.

An initial value n (n>0) is set to an output port PO of the microcomputer 32 and an initial value 0 is set to the counter 33. A reset signal RES is applied to the microcomputer 32. As a result, the operation is started under the control of the microcomputer 32 in accordance with programmed instructions as shown in FIG. 7. The comparator 34 compares the values (A) and (B) supplied to the input terminals A and B. Since (A)=0 and (B)=n, the comparator 34 determines (A)<(B) and produces the H-level output. As a result, the fluorescent lamp 2 is turned on under the control of the drive circuit until the count of the counter 33 reaches n.

The light reflected by the white area 10 is focused onto the image pick-up device 5 through the focusing lens 4 and the photo-electrically converted signal is amplified by the amplifier 6. The signal is then converted to the digital signal by the A/D converter 7 and it is supplied to the microcomputer 32. The white reference signal level L is set to (0001) by the program and the image signal level L' (FL DATA) read from the white area 10 is compared with the reference signal level (0001) as shown in FIG. 7.

If the image signal level L' is, for example, (0010), the comparator 34 determines that the luminance is smaller and the preset count n at the output port PO is incremented by one to a count (n+1), which is supplied to the comparator 34. Thus, the comparator 34 produces the L-level output when the value (A) supplied to the input terminal A, that is, the count of the clock pulse CK reaches (n+1). As a result, the turn-on time of the fluorescent lamp 2 is extended by one clock period longer than the previous scan. Thus, the amount of illumination to the white area 10 by the fluorescent lamp 2 is increased. The above operation is repeated to increment the value at the output port PO of the microcomputer 32 by one at a time for each scan until the image signal level L' reaches (0001).

On the other hand, if the luminance is larger, that is, if the image signal level L' is (0000), a count (n−1) which is one less than the initial value n is supplied to the comparator 34. As a result, the turn-on time of the fluorescent lamp 2 is reduced and the amount of illumination by the fluorescent lamp 2 is reduced.

Figure 8:
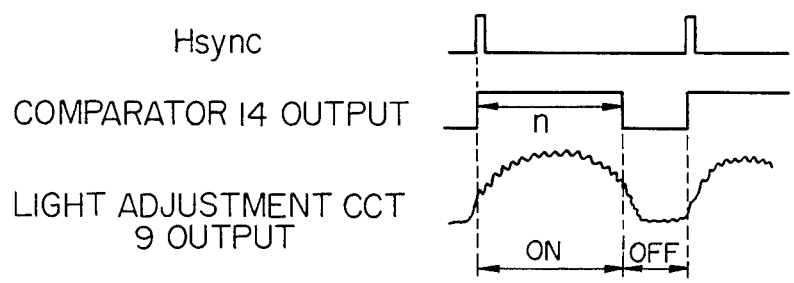
FIG. 8 shows waveforms.

The operation of the write unit 40 which produces the horizontal synchronizing signal $H_{SYNC}$ is now explained. FIG. 8 shows the waveforms of $H_{SYNC}$, the output of the comparator 34 and the output of the light adjustment circuit 9. The write unit 40 is a light scanner which uses the laser as the recording light source and irradiates the laser beam to the photosensitive material through the optical system such as a light deflector to form a beam spot. The image signal from the read unit 30 is supplied to the laser oscillator 43 where it is converted to the laser beam 44 in accordance with the image signal. The laser beam 44 is reflected by the rotary polygon mirror 45 so that the beam spot is formed on the photosensitive material 42. The beam spot passes through the laser beam detector 41 for each line scan and the light signal detected by the laser beam detector 41 is converted to a trigger pulse by the photo-electric converter 46, which supplies it to the input terminal LD of the counter 33 of the read unit 30 as the horizontal synchronizing signal $H_{SYNC}$ and to the image pick-up device 5 as the charge storage start signal. The counter 33 is reset to zero in synchronism with the signal $H_{SYNC}$ and starts to count the clock pulse CK from count 0. Thus, the comparison of the count of the counter 33 and the count at the output port PO of the microcomputer 32 for each scan is made at the period of the signal $H_{SYNC}$.

The above operation is repeated to change the duty factor of the high frequency voltage source supplied to the fluorescent lamp 2 to control the turn-on time by the count at the output port PO and the turn-on cycle is synchronized to the period of the horizontal synchronizing signal $H_{SYNC}$ so that the white pixel signal level L' coincides with the reference signal level L. Thereafter, the document is exposed.

Figure 9:
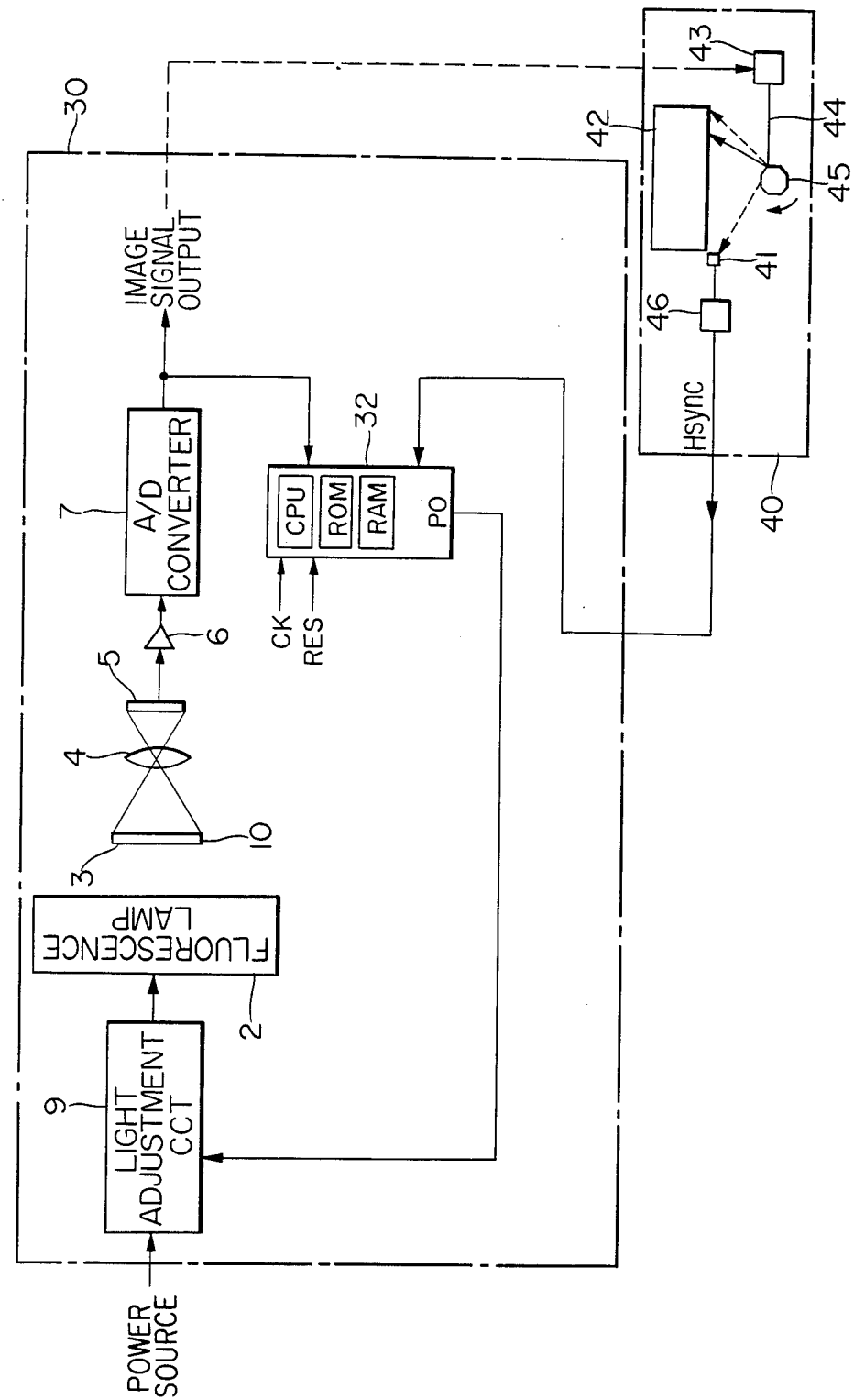
FIG. 9 shows a further embodiment of the document reader in accordance with the present invention.

While the light adjustment is made by the combination of the microcomputer and the peripheral elements in the above embodiment, the adjustment may be made by only the microcomputer. A configuration therefor is shown in FIG. 9, in which the like elements to those shown in FIG. 6 are designated by the like numerals. The output of the microcomputer is directly supplied to the light adjustment circuit 9 and the horizontal synchronizing signal $H_{SYNC}$ from the write unit 40 is supplied to the microcomputer 32. The operations carried out by the counter 33, the comparator 34 and the flip-flop 35 in FIG. 6 are programmed and stored in a ROM of the microcomputer 32 to control the turn-on time at the period of the horizontal synchronizing signal $H_{SYNC}$.

Figure 10:
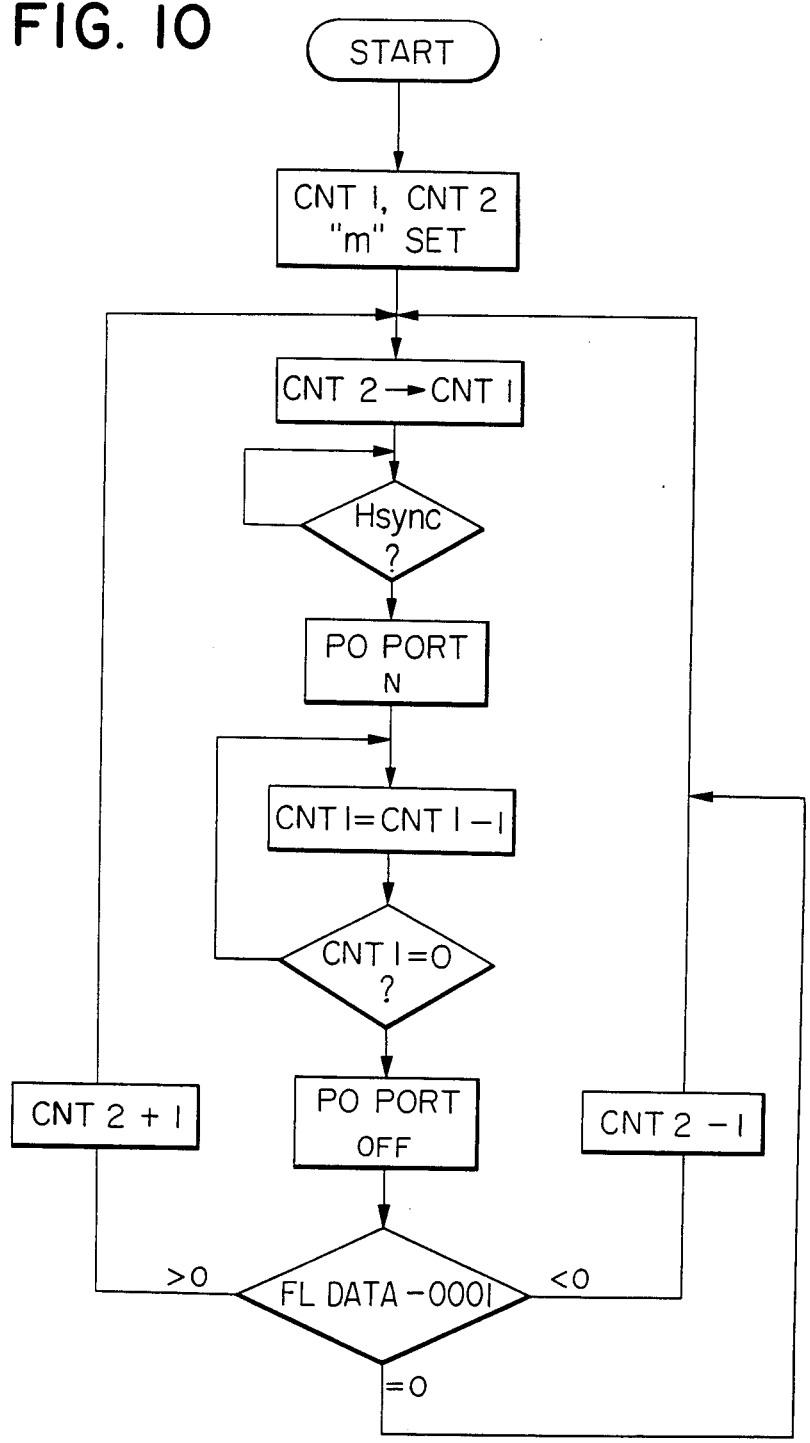
FIG. 10 is a flow chart of a control program for the circuit of FIG. 9.

FIG. 10 shows the program stored in the ROM. At the start of the exposure, counters CNT1 and CNT2 in a RAM of the microcomputer 32 are set to m. When the horizontal synchronizing signal $H_{SYNC}$ is applied from the write unit 40, the port PO is set to the H-level. The counter CNT1 is decremented by one at a time in synchronism with the count input, and when the count reaches zero, the port PO is set to the L-level. Thus, the port PO is held at the H-level for the period corresponding to the count set in the counter CNT1 and the H-level signal is applied to the light adjustment circuit 9, which supplies the high frequency voltage to the fluorescent lamp when the input signal thereto is at the H-level. In this manner, the turn-on time in one scan period is determined.

After the termination of the output at the port PO, the reference signal (e.g. 0001) is subtracted from the data supplied from the A/D converter 7. If the resulting difference is larger than zero, it is determined that the turn-on time is shorter and the counter CNT2 is incremented by one. If the difference is smaller than zero or equal to zero, the counter CNT2 is decremented by one. The result is used as the turn-on time in the next scan.

The above operation is repeated to determine the turn-on time of the fluorescent lamp in one scan period. The document is exposed with the resulting turn-on time.

As described hereinabove, according to the present invention, the reference color area is provided at a portion of the effective read area and the amount of illumination of the document is controlled such that the reference color pixel signal level derived from the reference color area coincides with the preset reference signal level. Accordingly, the constant level of photoelectrically converted signal can always be produced and the image is exactly reproduced even for the document having half-tone image on the entire area such as photograph.

What I claim is:

1. A document reader comprising:
   a light source operable to turn on when electric power is supplied thereto;
   reading means for reading a document image illuminated by said light source on a basis of line by line scanning, and generating an image signal representing the document image;
   a reference density pattern;
   means for determining a period of time of supply of electric power to said light source to obtain an adequate light quantity for reading of the document image by said reading means, based on an output level of said reading means at the time when it reads said reference density pattern illuminated by said light source; and
   control means for controlling a supply of electric power to said light source such that the period of electric power supply determined by said determining means is initiated in synchronism with each line scanning of said reading means.

2. A document reader according to claim 1, wherein said control means includes timer means and controls the period of electric power supply in accordance with time counting of said timer means.

3. A document reader according to claim 1, wherein said light source is a fluorescent lamp.

4. A document reader according to claim 1, wherein said control means initiates supply of electric power to said light source based on a synchronization signal associated with each line scanning of said reading means.

5. A document reader according to claim 4, further comprising means for forming an image on a line by line basis based on the image signal generated from said reading means, wherein said synchronization signal is produced in synchronism with each line of image formation of said forming means.

6. A document reader according to claim 1, wherein said determining means includes means for comparing the output level of said reading means and a reference level with each other, and determines the period of electric power supply in accordance with the comparison result by said comparing means.

7. A document reader according to claim 1, wherein said reference density pattern is provided outside of the document area.

8. A document reader according to claim 1, wherein said reference density pattern is of white color.

9. A document reader according to claim 1, wherein said reading means is operable to read said reference density pattern prior to reading of the document image.

10. A document reader comprising:
    a light source operable to turn on when electric power is supplied thereto;
    reading means for reading a document image illuminated by said light source, and generating an image signal representing the document image;
    a reference density pattern, wherein said reading means and said pattern are arranged so that said reading means reads said pattern prior to reading the document image;
    means for determining an amount of electric power to be supplied to said light source based on an output level of said reading means at the time when said reading means reads said reference density pattern illuminated by said light source; and
    control means for controlling the amount of electric power to be supplied to said light source to obtain an adequate light quantity for reading of the document image by said reading means, based on the amount determined by said determining means, and to retain the amount of electric power to be supplied to said light source at the amount determined by said determining means, while said reading means reads the document image.

11. A document reader according to claim 10, wherein said determining means includes means for comparing the output level and a reference level with each other.

12. A document reader according to claim 10, wherein said reading means reads the document image on a line by line scanning basis.

13. A document reader according to claim 12, wherein said control means controls a period of electric power supply to said light source in each line scanning of said reading means.

14. A document reader according to claim 3, wherein said control means includes timer means and controls the period of electric power supply in accordance with time counting of said timer means.

15. A document reader according to claim 10, wherein said light source is a fluorescent lamp.

16. A document reader according to claim 10, wherein said reference density pattern is provided outside of the document area.

17. A document reader according to claim 10, wherein said reference density pattern is of white color.

18. A document reader comprising:
    a light source operable to turn on when electric power is supplied thereto;
    reading means for reading a document image illuminated by said light source, and generating an image signal representing the document image;
    a reference density pattern, wherein said pattern and said reading means are arranged so that said reading means reads said pattern prior to reading of the document image;
    control means for controlling an amount of electric power to be supplied to said light source such than an output level of said reading means at the time when it reads said reference density pattern illuminated by said light source becomes a reference level; and
    means for causing said reading means to read the document image, when the output level of said reading means at the time when it reads said reference density pattern becomes the reference level, under control of the amount of electric power to be supplied to said light source by said control means.

19. A document reader according to claim 18, wherein said control means controls the amount of electric power to be supplied to said light source so as to retained at the amount determined when said reading means reads said reference density pattern, while said reading means reads the document image.

20. A document reader according to claim 18, wherein said reading means reads the document image on a line by line scanning basis.

21. A document reader according to claim 20, wherein said control means controls a period of electric power supply to said light source in each line scanning of said reading means.

22. A document reader according to claim 21, wherein said control means includes timer means and controls the period of electric power supply in accordance with time counting of said timer means.

23. A document reader according to claim 18, wherein said control means includes means for comparing the output level and the reference level with each other.

24. A document reader according to claim 18, wherein said light source is a fluorescent lamp.

25. A document reader according to claim 18, wherein said reference density pattern is provided outside of the document area.

26. A document reader according to claim 18, wherein said reference density pattern is of white color.

* * * * *